US008177611B2

(12) United States Patent
Kang (10) Patent No.: US 8,177,611 B2
(45) Date of Patent: May 15, 2012

(54) SCHEME FOR INSERTING A MIMICKED PERFORMANCE INTO A SCENE AND PROVIDING AN EVALUATION OF SAME

(75) Inventor: Peter Kang, San Francisco, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 699 days.

(21) Appl. No.: 12/333,160

(22) Filed: Dec. 11, 2008

(65) Prior Publication Data

US 2009/0163262 A1    Jun. 25, 2009

Related U.S. Application Data

(60) Provisional application No. 61/016,216, filed on Dec. 21, 2007.

(51) Int. Cl.
*A63F 9/24* (2006.01)

(52) U.S. Cl. .................. 463/7; 463/31; 463/35; 463/40; 463/41; 463/43; 463/42

(58) Field of Classification Search ........................ None
See application file for complete search history.

(56) References Cited

U.S. PATENT DOCUMENTS

| | | | |
|---|---|---|---|
| 6,394,895 B1 * | 5/2002 | Mino ................................. | 463/3 |
| 6,537,078 B2 | 3/2003 | Jean | |
| 6,661,496 B2 | 12/2003 | Sherman et al. | |

OTHER PUBLICATIONS

Patent Cooperation Treaty; "Notification of Transmittal of the International Search Report and the Written Opinion of the International Searching Authority, or the Declaration" issued in PCT/US08/86469, which corresponds to U.S. Appl. No. 12/333,160; mailed Feb. 9, 2009; 1 page.
Patent Cooperation Treaty; "International Search Report" issued in PCT/US08/86469, which corresponds to U.S. Appl. No. 12/333,160; mailed Feb. 9, 2009; 3 pages.
Patent Cooperation Treaty; "Written Opinion of the International Searching Authority" issued in PCT/US08/86469, which corresponds to U.S. Appl. No. 12/333,160; mailed Feb. 9, 2009; 6 pages.

* cited by examiner

*Primary Examiner* — David E Graybill
(74) *Attorney, Agent, or Firm* — Flitch, Even, Tabin & Flannery, LLP (57) ABSTRACT

A method for use in relation to a performance includes receiving a selection of a reference video segment, capturing a performance with a camera, generating a new video segment that is representative of the reference video segment having a portion thereof that is replaced with at least a portion of the captured performance, and displaying the new video segment on a display. Another method includes displaying a representation of a new video segment in the online community and providing feedback relating to the captured performance. And another method includes comparing one or more aspects of a performance with corresponding aspects of a reference performance, and providing an indication of how closely the performance matches the reference performance. A storage medium stores a computer program adapted to cause a processor based system to execute the steps of any one or more of these methods.

10 Claims, 10 Drawing Sheets

SCHEME FOR INSERTING A MIMICKED PERFORMANCE INTO A SCENE AND PROVIDING AN EVALUATION OF SAME

CROSS-REFERENCE TO RELATED APPLICATIONS

This application claims the benefit of U.S. Provisional Patent Application No. 61/016,216, filed Dec. 21, 2007, entitled "SCHEME FOR INSERTING A MIMICKED PERFORMANCE INTO A SCENE AND PROVIDING AN EVALUATION OF SAME," the entire disclosure of which is hereby incorporated by reference herein in its entirety.

BACKGROUND OF THE INVENTION

1. Field of the Invention

The present invention relates generally to video entertainment, and more specifically to interactive video entertainment.

2. Discussion of the Related Art

One of the most popular forms of entertainment involves the viewing of television, films, and videos. Technologies such as Digital Video Disks (DVDs), Digital Video Recorders (DVRs), and Video on Demand (VOD) have allowed fans to view their favorite movies and shows an unlimited number of times.

Another popular form of entertainment are video games. Commercially available game consoles allow users to play video games in the comfort of their own homes. Some games become extremely popular, generating huge revenues, which leaves the video gaming industry constantly trying to develop the next hit video game.

SUMMARY OF THE INVENTION

One embodiment provides a method for use in relation to a performance, comprising: receiving a selection of a reference video segment; capturing a performance with a camera; generating a new video segment that is representative of the reference video segment having a portion thereof that is replaced with at least a portion of the captured performance; and displaying the new video segment on a display; wherein the camera and the display are coupled to a processor based system that performs the steps of receiving and generating.

Another embodiment provides a method for use in relation to a performance, comprising: displaying a reference video segment in an online community; receiving data from a camera capturing a performance, wherein the camera is coupled to a client device; generating a new video segment that is representative of the reference video segment having a portion thereof that is replaced with at least a portion of the captured performance; displaying a representation of the new video segment in the online community; and providing to the client device feedback relating to the portion of the captured performance.

Another embodiment provides a method for use in relation to a performance, comprising: capturing a performance with a camera; receiving output data from the camera that is representative of the performance; processing the output data to compare one or more aspects of the performance with corresponding aspects of a reference performance; and providing an indication of how closely the performance matches the reference performance.

In some embodiments, the present invention provides a storage medium storing a computer program adapted to cause a processor based system to execute the steps of any one or more of the above-mentioned methods.

For example, another embodiment provides a storage medium storing a computer program adapted to cause a processor based system to execute steps comprising: receiving a selection of a reference video segment; capturing a performance with a camera; generating a new video segment that is representative of the reference video segment having a portion thereof that is replaced with at least a portion of the captured performance; and displaying the new video segment on a display; wherein the camera and the display are coupled to the processor based system that performs the steps of receiving and generating.

Another embodiment provides a storage medium storing a computer program adapted to cause a processor based system to execute steps comprising: displaying a reference video segment in an online community; receiving data from a camera capturing a performance, wherein the camera is coupled to a client device; generating a new video segment that is representative of the reference video segment having a portion thereof that is replaced with at least a portion of the captured performance; displaying a representation of the new video segment in the online community; and providing to the client device feedback relating to the portion of the captured performance.

Another embodiment provides a storage medium storing a computer program adapted to cause a processor based system to execute steps comprising: capturing a performance with a camera; receiving output data from the camera that is representative of the performance; processing the output data to compare one or more aspects of the performance with corresponding aspects of a reference performance; and providing an indication of how closely the performance matches the reference performance.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein.

DETAILED DESCRIPTION

The viewing of television, films, and videos provides passive entertainment. That is, once the individual enters the movie theatre, selects the television channel, or begins to play a DVD, the video entertainment experience is predominately passive. An individual watching the video typically has the same experience each time the video is viewed.

On the other hand, video game players understand the thrill of actively interacting with a video game. These so-called "gamers" use controllers, game pads, joysticks, and buttons to control characters placed in an artificial generated environment or "virtual world". A gamer might, for example, use a game pad to control an image of their favorite football player in a football game or use a joystick to control a cartoon character in another game. The ability to control the outcome makes the video game experience rich, interesting, and potentially different each time the game is played.

Meanwhile, recent reductions in the cost of video equipment and video storage technologies have allowed individuals to inexpensively produce their own videos. Individuals often produce videos with content targeted to specific audiences. The content may, for example, portray the individual and his or her friends singing, dancing, acting, and/or performing other interesting activities. These videos are frequently shared with a larger viewing community through video sharing websites.

It has been recognized by the inventor hereof that while passively viewing television, films, and videos can be enjoyable, many viewers would also enjoy having a more interactive experience. For example, it is not uncommon for people to memorize the dialogue of their favorite movie or TV scenes. These people sometimes act out famous scenes to their friends and family for fun.

Some of the embodiments of the present invention are capable of providing an interactive experience involving movies, TV shows, and other videos. For example, some embodiments provide the ability for players, performers, or other users to actually see themselves in their favorite movie or TV scenes. Namely, players act out a scene themselves in front of a camera. A player might, for example, emulate the performance of a famous actor, singer, or dancer. Then, at least a portion of the captured performance is used to replace a corresponding portion of the original scene. This can provide a fun and entertaining experience and challenges the player to try to mimic the original scene as closely as possible.

Use of the methods and techniques described herein provides the player or other user with a more interactive experience than simply passive viewing of the scene. For example, the methods and techniques described herein lay out the foundation in terms of background images, video, sound, and supporting actors. The player is then added or super-imposed into the game scene so that he or she can feel fully immersed into the game. Not only is the player immersed into the game, but he or she is also immersed into a famous motion picture or TV scene. Many players will find this experience very entertaining and rewarding, especially if they aspire to be an actor or TV personality.

Figure 1:
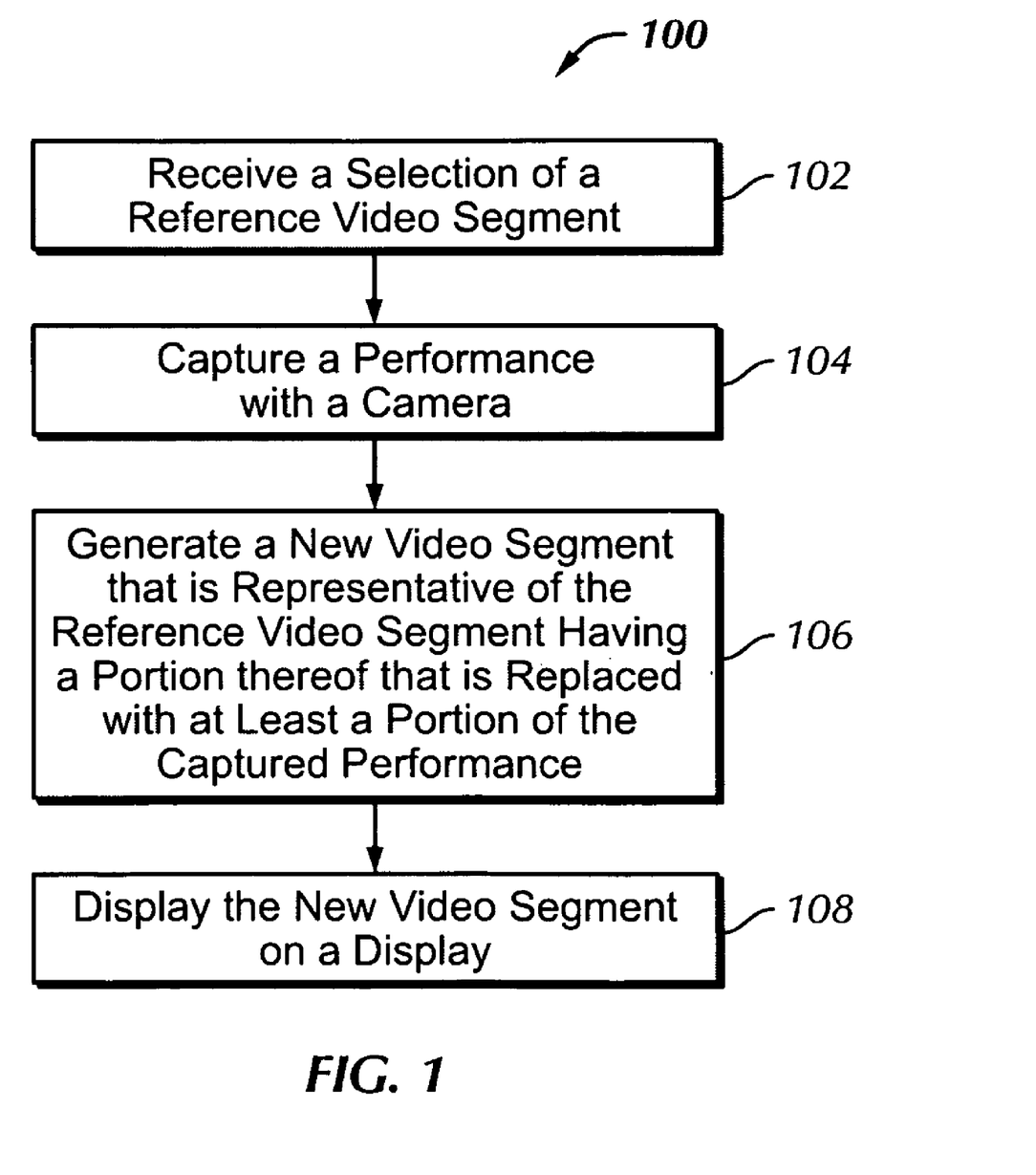
FIG. 1 is a flow diagram illustrating a method for use in relation to a performance in accordance with an embodiment of the present invention.

Referring to FIG. 1, there is illustrated a method 100 that operates in accordance with an embodiment of the present invention. The method 100 begins in step 102 in which a selection of a reference video segment is received. The reference video segment may comprise a video segment that the user will attempt to mimic or otherwise act out. As such, the reference video segment preferably shows at least one character engaged in some interesting activity. The user will typically attempt to mimic the character's performance.

In some embodiments, the method 100 may be at least partially implemented by a processor based system, such as an entertainment system or game console. In this scenario the selection of the reference video segment will be received by the processor based system. The video segment may be selected using a keyboard, mouse, gamepad, video game controller, television controls, DVD controls, remote device, or any other suitable selection device.

In some embodiments, the processor based system may allow the user to select from pre-loaded scenes from famous movies, TV shows, accolades, etc. The reference video segment may comprises a video segment from any work, such as for example a previously published movie, television show, television broadcast, video game, sporting event, music video, etc. For example, the reference video segment may be any scene from a movie, a television show, a recorded performance, a music video, a commercial, a training video or any other video recording. In some embodiments, the system may provide the ability to download more scenes and/or scripts, such as from an on-line store or library. The system may allow the user to view the original theatrical scene so the user can see how the original version was performed. In some embodiments, the system allows the user to print out the monologue/ screenplay, or provides it in a manual.

In step 104 a performance is captured with a camera. The performance may be by the user or some other person, or even an animal. The performance is preferably related to the actions of one of the characters in the selected reference video segment. The performance will often be the user or some other person attempting to mimic, recreate, duplicate, or even spoof the performance of a character in the reference video segment. It should be understood, however, that the performance may be nothing more than a user standing still in front of the camera.

In some embodiments, the camera may be coupled to the processor based system mention above. The camera may comprise any type of camera or image capturing device, such as for example, a digital camera, webcam, or similar camera. By way of example, the camera may comprise a camera peripheral device such as the commercially available Sony EyeToy™ product. But it should be well understood that any type or brand of camera may be used, such as for example a web-cam camera, add-on USB camera, infrared (IR) capability camera, fast frame capture rate camera, etc.

In some embodiments, the camera may comprise a Z-camera or depth camera. Such a Z-camera or depth camera may, for example, provide or measure a depth of each pixel and/or determine the distance of a pixel from the camera. As such, any of the cameras or other image capturing devices described herein may, in some embodiments, comprise any type of three-dimensional camera.

In some embodiments, the performance may be captured while the reference video segment is displayed. This will allow the performer to view the reference video segment while he or she is executing the performance. The performance may also be executed without the reference video segment with the performer executing the performance independently. For example, a performer may watch the reference video segment multiple times and then attempt to execute a similar performance entirely from memory.

In step 106 a new video segment is generated that is representative of the reference video segment having a portion thereof that is replaced with at least a portion of the captured performance. As such, the new video segment may have the appearance of the reference video segment with portions thereof being replaced by portions of the captured performance. For example, a character in the reference video segment may be replaced by the captured performance of the user. As another example, the user's face may be mapped into the original scene. With this capability, the user is able to see himself or herself acting in a favorite movie or TV scene.

In some embodiments, the new video segment is generated by the processor based system mentioned above. Again, such processor based system may comprise any type of device, such as an entertainment system, game console, or the like. In some embodiments, the new video segment may be generated in real time.

In some embodiments, the character in the reference video segment may be completely replaced by the captured performance of the user. In some embodiments, the new video segment may feature the captured performance superimposed over the images from the reference video segment. The use of special effects to generate the new video segment is also contemplated. For example, a character from the reference video segment may be morphed with the captured performance.

In some embodiments, the reference video segment is pre-processed in some way to make it more suitable for the generation of the new video segment. For example, a camera view in a video segment from a work may be modified or adjusted in the reference video segment. The specific adjustment may depend on the scene. As an example, a moving or panning camera in the original work may be modified to be a still shot. This will make it easier for a portion of the reference video segment to be replaced with at least a portion of the captured performance. This is because the captured performance may be captured by a fixed camera, i.e. a still shot. But it should be understood that the captured performance may be a moving or panning shot as well in order to more closely duplicate the original work. As another example, a camera lens used in a video segment from a work may be modified or adjusted in the reference video segment.

In step 108 the new video segment is displayed on a display. The display may be coupled to the processor based system mentioned above. The new video segment may be displayed after capturing the performance, which allows the performer to evaluate the performance. Post performance review of the performance to provide the performer with subjective and objective performance feedback is also contemplated and will be discussed below.

In some embodiments, the new video segment may be displayed in near real time allowing the performer to see his or her actions as they are incorporated into the new video segment. The new video segment may also be displayed alongside the reference video segment allowing the performer to note differences between the new video segment and the reference video segment. In some embodiments, both the new video segment and the reference video segment may be displayed simultaneously in real time allowing real time performance adjustments to synchronize the captured performance with the reference video.

Figure 2A:
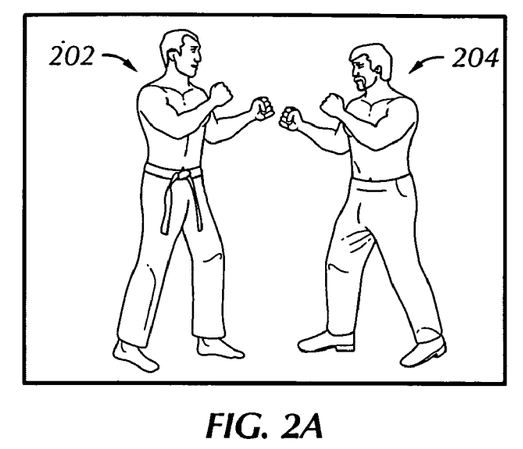
FIGS. 2A, 2B and 2C are screen shots illustrating representative frames of an exemplary reference video segment to be used in accordance with embodiments of the present invention.
Figure 2B:
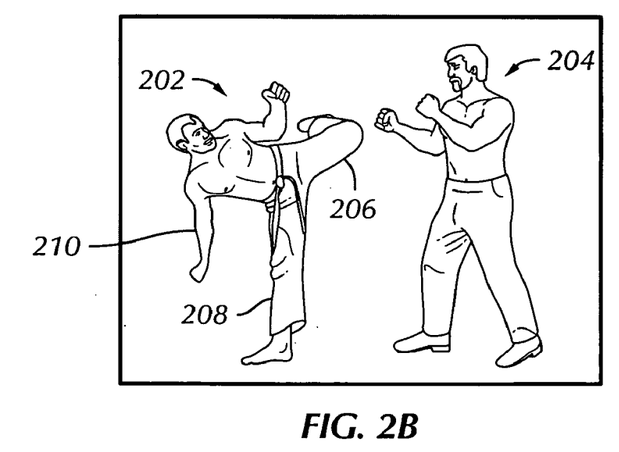
Figure 2C:
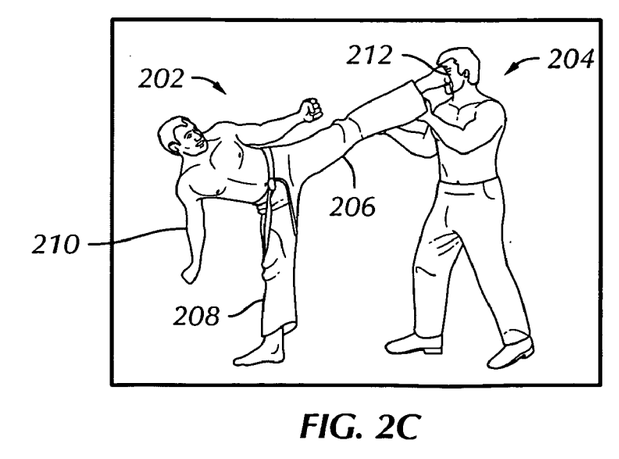

FIGS. 2A, 2B and 2C illustrate representative frames from an exemplary reference video segment, such as may be selected in step 102 of the method 100 (FIG. 1). The illustrated reference video segment may, for example, comprise a video segment from any type of work, such as any of the works mentioned above. The reference video segment shows a character 202 engaged in an activity. The character 202 may, for example, be a famous actor, celebrity, sports figure, or some other person. The user (or other performer) may want to imitate or mimic the character 202's performance and see himself in the video segment.

The first frame, shown in FIG. 2A, shows the character 202 preparing to engage a martial arts opponent 204. The character 202 is in the ready stance with his opponent 204 also in a martial arts ready stance. In FIG. 2B, the character 202 is in the process of delivering a front kick to his opponent 204. The character's left leg 206 is lifted and his weight has shifted to his right leg 208. His arms 210 move for balance and delivering reaction force and speed to his kick. In FIG. 2C, the character 202 has delivered a front kick with his left leg 206 to the face 212 of his opponent 204. The character's arms 210 and right leg 208 are correctly positioned to deliver maximum force and speed to his kick. The character's left leg 206 is perfectly positioned and high enough to reach the opponent 204's face 212.

Figure 3:
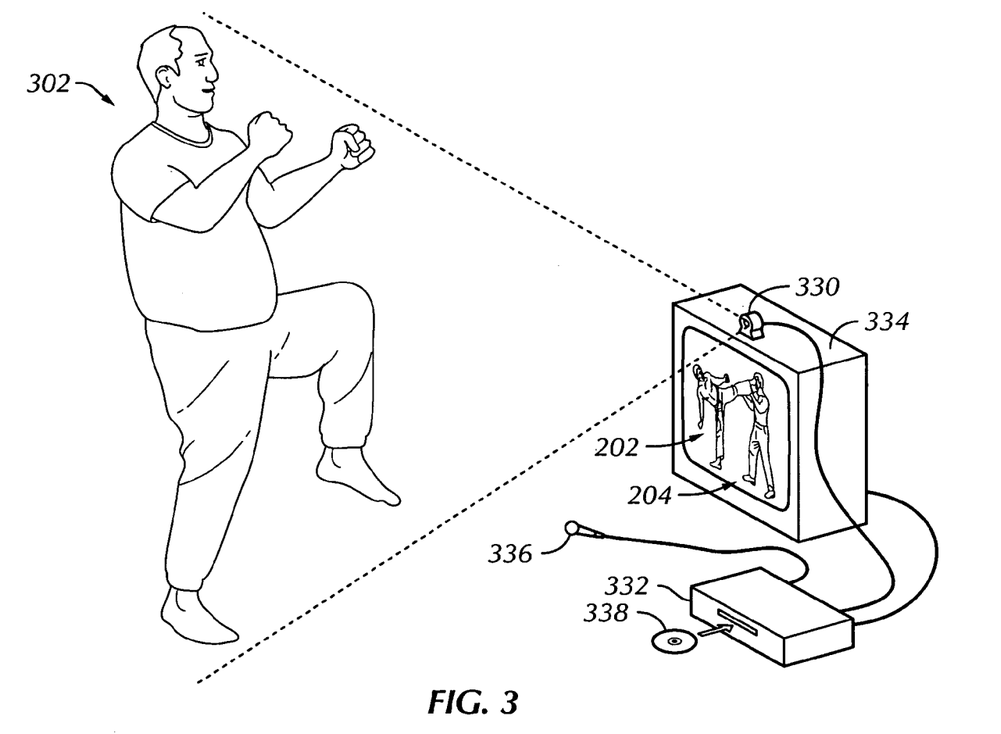
FIG. 3 is a pictorial diagram illustrating a user's performance to be used in accordance with embodiments of the present invention.

FIG. 3 illustrates an exemplary performance of an individual user or performer 302 attempting to mimic the character 202's performance. The performance of the performer 302 may be used in connection with step 104 of the method 100 (FIG. 1). The performer 302 may be an ordinary individual at home having an interest in seeing himself in his favorite movie or TV scene. In this example, the performer 302 attempts to act out, mimic and/or recreate the kick scene in the reference video segment described above.

The performer 302's performance may be captured by a camera 330. As mentioned above, the camera 300 may comprise any type of camera, such as for example, a digital camera, webcam, Z-camera, or similar camera. As also mentioned above, the camera 330 may be coupled to a processor based system 332, such as for example an entertainment system or game console. The processor based system 332 is typically coupled to a display 334 and may also include a microphone 336. In some embodiments, the microphone 336 may be integrated with the camera 330. The processor based system 332 may also include removable storage media 338, such as a DVD, Blu-ray disc, CD, etc.

The performance is captured when the performer 302 performs in front of the camera 330. In some embodiments, the reference video segment is displayed on the display 334 while the performer 302 performs. This way, the performer 302 may view the reference video segment while he is performing. That is, the performer 302 is able to see the actual actions of the character 202 on the display 334, which may help the performer 302 execute a performance that more closely matches or mimics the character 202's performance. In some embodiments, the reference video segment may be a scene selected from one or more scenes stored on the removable storage media 338.

Figure 4A:
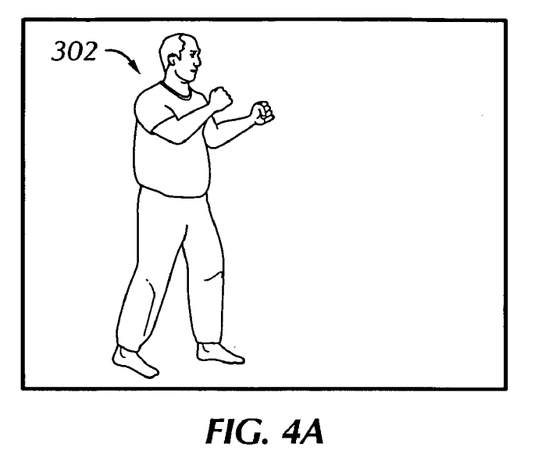
FIGS. 4A, 4B and 4C are screen shots illustrating representative frames of the user's performance to be used in accordance with embodiments of the present invention.

FIGS. 4A, 4B and 4C illustrate representative frames captured from the exemplary performance illustrated in FIG. 3. FIG. 4A shows the performer 302 in a ready stance, attempting to imitate the character 202's ready stance shown in FIG.

Figure 4B:
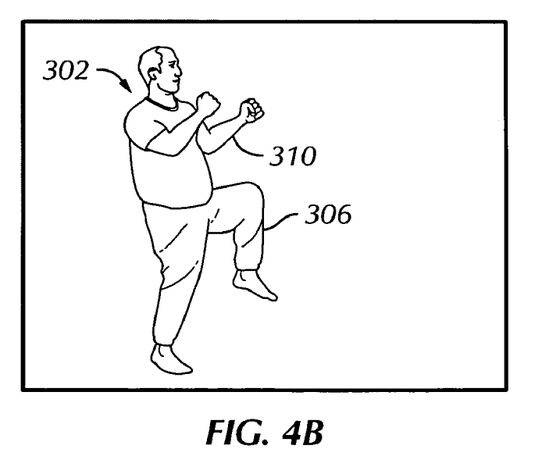
Figure 4C:
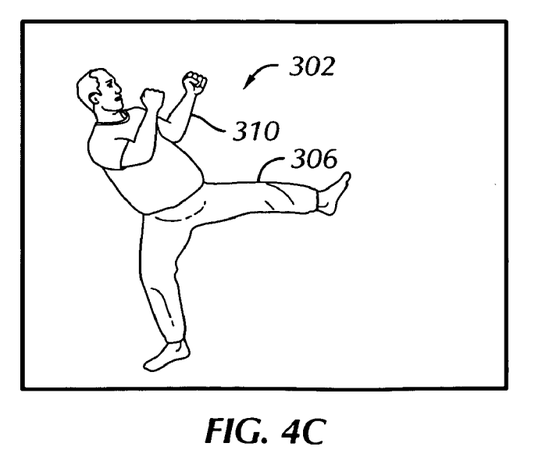

2A. FIG. 4B shows the performer 302 lifting his left leg 306, attempting to imitate the character 202's technique of delivering a front kick as shown in FIG. 2B. Notably, the performer 302's knee on his left leg 306 is not extended as highly as the character 202's knee on his left leg 206. Furthermore, the performer 302's arms 310 fail to adequately balance the performer 302, resulting in an awkward stance. FIG. 4C shows the performer 302 trying to execute the character 202's kick to the opponent 204's face shown in FIG. 2C. Notably the performer 302's foot on his left leg 306 is nowhere near high enough to engage an opponent's face.

Figure 5A:
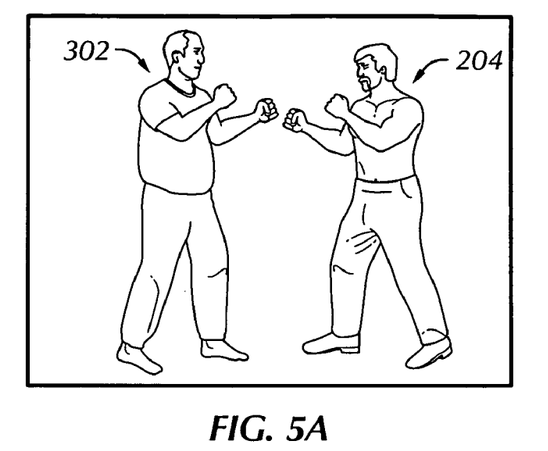
FIGS. 5A, 5B and 5C are screen shots illustrating representative frames of a new video segment generated in accordance with an embodiment of the present invention.
Figure 5B:
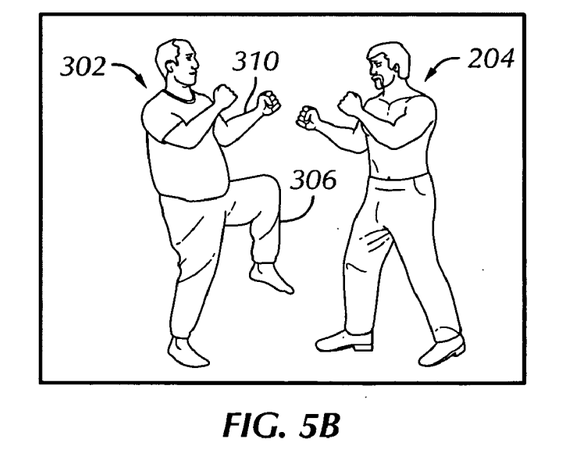
Figure 5C:
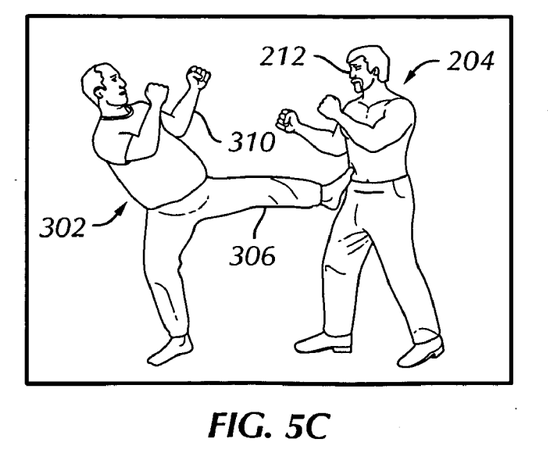

FIGS. 5A, 5B and 5C illustrate representative frames of a new video segment that has been generated in accordance with step 106 of the method 100 (FIG. 1). Namely, the new video segment (FIGS. 5A, 5B and 5C) is representative of the reference video segment (FIGS. 2A, 2B, 2C) having a portion thereof that is replaced with at least a portion of the captured performance (FIGS. 4A, 4B, 4C). As mentioned above, in some embodiments the new video segment is generated by a processor based system, such as the processor based system 332 (FIG. 3).

More specifically, the new video segment includes most of the features from the reference video segment. Notably, however, the original character 202 is not featured in the new video segment. Instead, the character 202 is replaced with the performer 302. That is, the portion of the reference video segment (FIGS. 2A, 2B, 2C) having the character 202 is replaced with the portion of the captured performance (FIGS. 4A, 4B, 4C) having the performer 302.

In FIG. 5A, the performer 302 is shown in ready stance against the opponent 204. In FIG. 5B, the performer 302 is shown lifting his left leg 306, attempting to imitate and/or mimic the character 202's technique of delivering a front kick. This is the same position of the performer 302 shown in FIG. 4B, but this time the performer 302 is shown in front of the opponent 204. As mentioned above, the performer 302's knee on his left leg 306 is not extended as highly as it should be. Furthermore, the performer 302's arms 310 fail to adequately balance the performer 302, resulting in an awkward stance. FIG. 5C shows the performer 302 trying to execute a kick to the face 212 of the opponent 204. In this frame of the new video segment, however, it can clearly be seen that the performer 302's foot on his left leg 306 is nowhere near high enough to engage the opponent 204's face 212.

With the method and system described thus far the user is able to view his own performance by watching the new video segment so that he can make improvements in his next attempt. This example involved the character 202's entire body being replaced with the performer 302's entire body. In some embodiments, however, the step of generating a new video segment comprises replacing only a portion of the character with a corresponding portion of the user. For example, the character's face, or even a portion thereof, may be replaced with the face or corresponding portion of the face of the user.

The above described example also involved the user attempting to mimic a martial arts kick, but it should be well understood that the user may attempt many other different types of performances. For example, players may rehearse dialogue and then act in front of the camera with a microphone picking up the lines spoken by the user. In some embodiments, audio provided by the performance may be captured with a microphone that is coupled to the processor based system. An example of such a microphone is the microphone 336 (FIG. 3). Then, at least a portion of original audio in the reference video segment is replaced with corresponding portions of the captured audio. This allows the user to not only see himself or herself acting, but to also hear himself or herself speaking the dialogue of a favorite scene. This effectively allows the user to be able to rehearse famous dialogue alongside an actor or actress imposed into the scene by the above described techniques.

Figure 6:
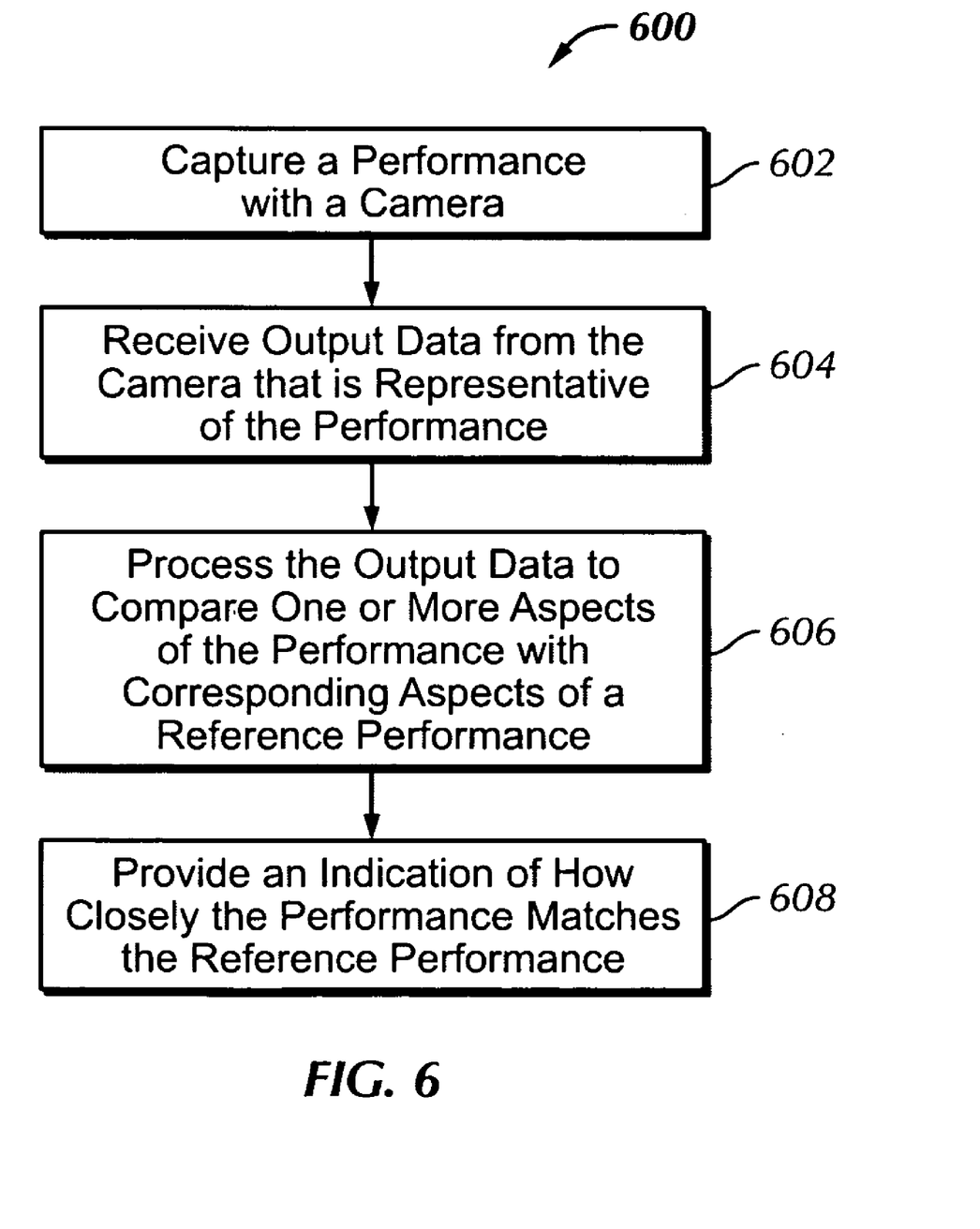
FIG. 6 is a flow diagram illustrating a method for use in relation to a performance in accordance with another embodiment of the present invention.

Referring to FIG. 6, there is illustrated a method 600 that operates in accordance with another embodiment of the present invention. The method 600 may be used in relation to a performance for "scoring" or evaluating the performance. That is, the method 600 may be used for determining how closely the user or other performer mimics or recreates the relevant portion of the reference video segment.

Specifically, the method 600 begins in step 602 in which a performance is captured with a camera. The performance may comprise any type of performance, such as any of the performances described above. For example, the performance may comprise a performance by a user. The performance may be captured as described above or in some other manner. In step 604, output data is received from the camera that is representative of the performance. The output data may comprises any type of data.

In step 606, the output data is processed to compare one or more aspects of the performance with corresponding aspects of a reference performance. By way of example, the reference performance may comprise any type of performance, such as for example any performance in a work or other reference video segment described above. For example, the reference performance may comprise a performance by a character.

In some embodiments, the comparing one or more aspects of the performance with corresponding aspects of the reference performance comprises comparing gestures by the user with gestures by the character. For example, hand movements, leg movements, body movements, facial expressions, etc., may be compared.

In some embodiments, the comparing one or more aspects of the performance with corresponding aspects of the reference performance comprises comparing audio. For example, audio provided by the user's performance may be captured as described above. Then, the captured audio is compared with audio provided by the reference performance.

Finally, in step 608 an indication is provided as to how closely the performance matches the reference performance. Thus, based on the comparison in step 606, an indication is provided which the performer can use to see how closely he or she imitated the reference video segment. This indication may be used for scoring or evaluating the performance. By way of example, scoring may be based on accuracy, delivery, missed cues, etc. That is, scoring may be used to measure how accurate the performer recreates the original character's (i.e. actor's) motions and gestures. In some embodiments, scoring may involve determining whether or not the performer speaks with the same cadence, pitch, sustain, etc., as the original character.

Figure 7A:
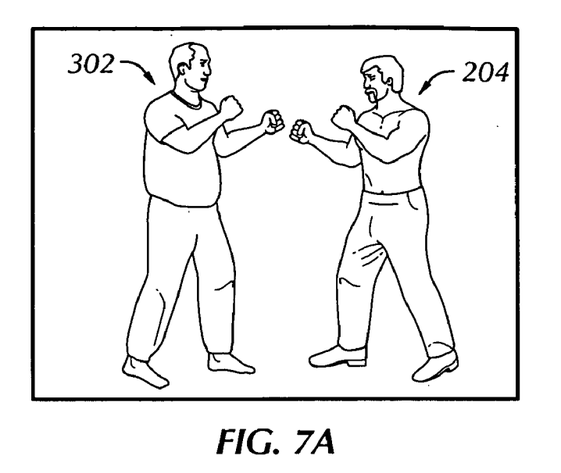
FIGS. 7A, 7B and 7C are screen shots illustrating representative frames of a new video segment generated in accordance with an embodiment of the present invention.
Figure 7B:
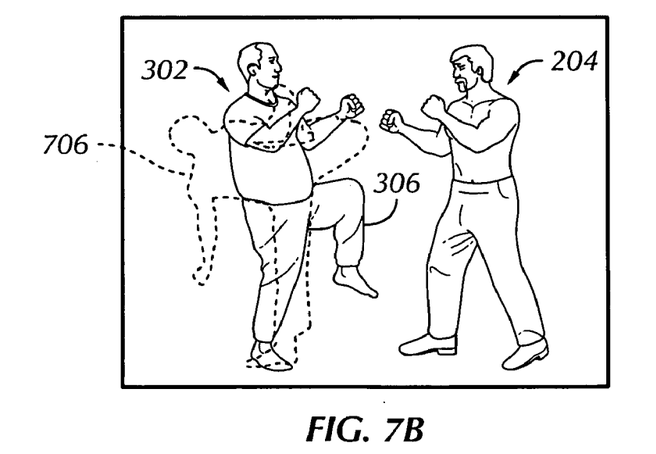
Figure 7C:
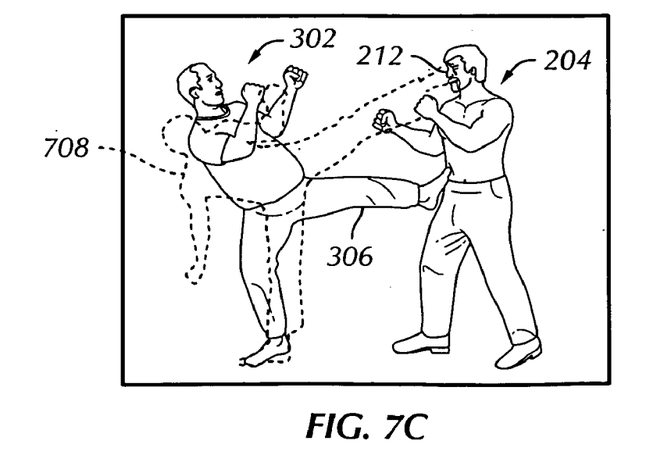

FIGS. 7A, 7B and 7C illustrate representative frames of the new video segment shown in FIGS. 5A, 5B and 5C, respectively, with the addition of an exemplary indication provided by step 608 (FIG. 6). That is, FIGS. 7A, 7B and 7C include an indication as to how closely the performer 302's performance matches the character 202's performance in the reference video segment (FIGS. 2A, 2B and 2C).

Specifically, in FIG. 7A, the performer 302 is shown in ready stance against the opponent 204. In FIG. 7B, the performer 302 is shown lifting his left leg 306, attempting to imitate and/or mimic the character 202's technique of delivering a front kick. As mentioned above, the performer 302's knee on his left leg 306 is not extended as highly as it should be. In order to illustrate this, the dashed line 706 indicates how the performer 302's entire body should be positioned in order to match the character 202's position in FIG. 2B. Similarly, FIG. 7C shows the performer 302 trying to execute a kick to the face 212 of the opponent 204. Again, as mentioned above, the performer 302's foot on his left leg 306 is nowhere near high enough to engage the opponent 204's face 212. In order to illustrate this, the dashed line 708 indicates how the performer 302's entire body should be positioned in order to match the character 202's position in FIG. 2C.

Thus, the provided indication as to how closely the performer 302's performance matches the character 202's performance can be used for scoring and/or evaluating the performer 302's performance. This can help users and players improve their performances to more closely recreate their favorite scenes.

Figure 8A:
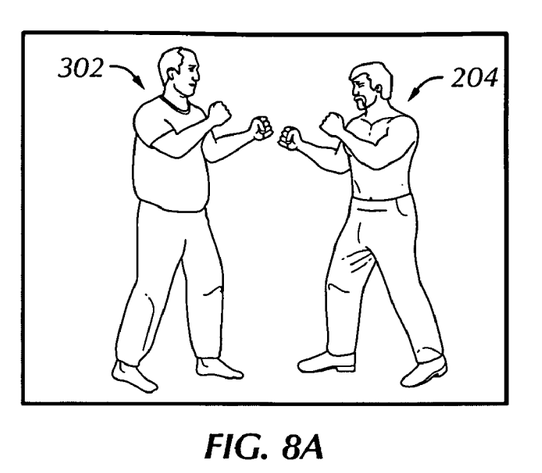
FIGS. 8A, 8B and 8C are screen shots illustrating representative frames of a new video segment generated in accordance with an embodiment of the present invention.
Figure 8B:
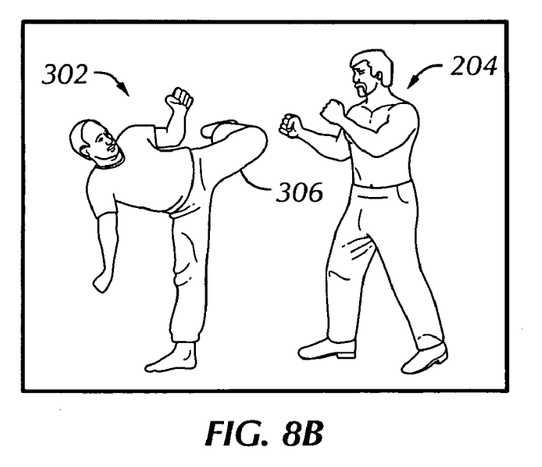
Figure 8C:
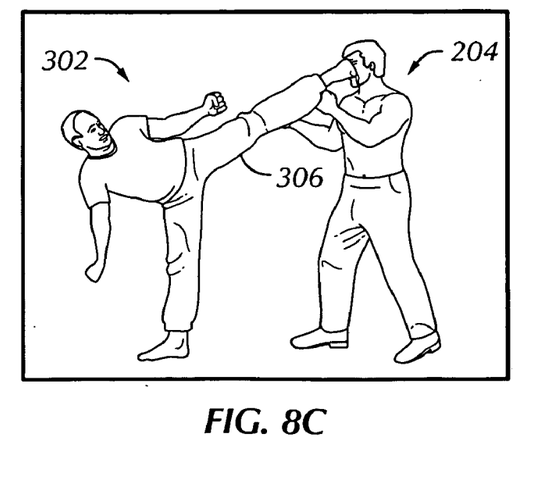

In some embodiments, the portion of the captured performance in the new video segment may be modified or corrected so that the portion of the captured performance more closely matches a corresponding portion in the reference performance. For example, FIGS. 8A, 8B and 8C illustrate representative frames of the new video segment shown in FIGS. 7A, 7B and 7C, respectively. Specifically, FIG. 8A shows the performer 302 in a ready stance against the opponent 204. In FIG. 8B, the new video segment has been modified so that the position of the performer 302's body substantially matches the position of the character 202's body in FIG. 2B. That is, the performer 302's body has been corrected by moving it to match the position of the dashed line 706 (FIG. 7B). Similarly, in FIG. 8C, the new video segment has been modified so that the position of performer 302's body substantially matches the position of the character 202's body in FIG. 2C. That is, the performer 302's body has been corrected by moving it to match the position of the dashed line 708 (FIG. 7C).

The ability to modify the new video segment to correct the player's performance allows the player to see himself or herself performing flawlessly in a favorite scene. For example, if a player's performance receives a score of 70%, the performance can be corrected to see what it would look like with a score of 100%. This will show how the player should have performed and acted in the scene. In some embodiments, a game can even be played to see if the player can recreate the score of 70%.

Such modifications and corrections may be applied to any part of the player's body, such as for example the player's limbs or other parts of the body, or to the player's face. For example, the player's lips can be adjusted and "touched up" to make them more closely match the reference video segment. In some embodiments, it is believed that technology used by MotionPortrait, Inc. of Tokyo, Japan (http://www.motionportrait.com/e/) can assist in implementing and/or executing such modifications and corrections.

In some embodiments, the performer or other user may be represented not by his or her actual picture, but instead by an avatar, character, some other person, some other likeness, etc. Furthermore, in some embodiments, the above methods and techniques may be used to track certain gestures by the performer or other user. For example, the system may track movements of the performer and recognize certain movements, such as a hand or leg movement. Various responses may be performed by the system in response to certain recognized movements. For example, in some embodiments such recognized gestures may trigger events such as a morphing of the performer into some other person, character, avatar, etc. As an example, the performer may be morphed into a cartoon character. Or, the performer may be represented by one avatar and then morphed into another avatar.

In some embodiments, the above methods and techniques are extended to the online environment. This provides options such as an online game where players can act in their favorite movie/TV scenes and be seen by others within a network or online community. The players may even be judged by other users on the network, or the players may just have fun acting and performing. In some embodiments, online contests may be held where players have set "rehearsal" (or "audition") times to appear and perform for an audience and/or judges. Based on performance, the players may proceed to further "auditions", and possibly win a prize. For example, a player may get voted as a "favorite" by members of an online community.

Figure 9:
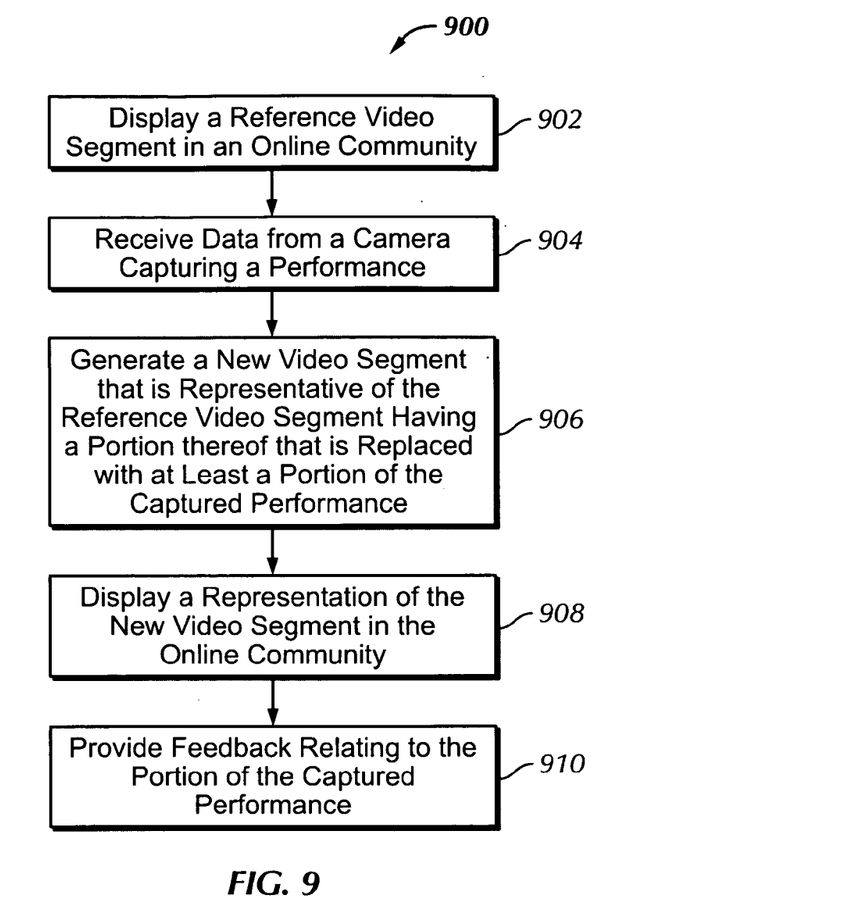
FIG. 9 is a flow diagram illustrating a method for use in relation to a performance in accordance with another embodiment of the present invention.

With respect to the online scenario, FIG. 9 illustrates a method 900 that operates in accordance with another embodiment of the present invention. The method 900, which may be used in relation to a performance, begins in step 902 in which a reference video segment is displayed in an online community. That is, a reference video segment is displayed so that other users in the online community can view the same reference video segment. This may be useful for a game or contest where multiple users will compete to see who can best mimic or imitate the reference video segment.

In step 904, data is received from a camera capturing a performance. The performance may be by a user, such as a member of the online community. The user may be attempting to mimic or imitate a performance in the reference video segment. In some embodiments, the camera is coupled to a client device operated by the user. The client device may comprise any of the processor based systems mentioned above, such as for example, an entertainment system or game console. The data from the camera may be received by the processor based system.

In step 906, a new video segment is generated that is representative of the reference video segment having a portion thereof that is replaced with at least a portion of the captured performance. This step may operate substantially as described above. For example, a character in the reference video segment may be at least partially replaced by the user giving the performance. The new video segment may be generated by the above-mentioned client device, by a server or computer associated with the online community, by some other computer, or by some combination of such devices.

In step 908, a representation of the new video segment is displayed in the online community. This allows other members and users in the online community to see the user's performance.

In step 910, feedback relating to the portion of the captured performance (that replaces the corresponding portion in the reference video segment) is provided to the client device. In some embodiments, the feedback may be provided by other users, judges, commentators, etc., in the online community. Such feedback may comprise commentary, criticism, reviews, scores, evaluations, etc. In some embodiments, the feedback may be provided by automated or partially automated means. For example, the feedback may comprise an indication of the type provided by step 608 above (FIG. 6).

Figure 10:
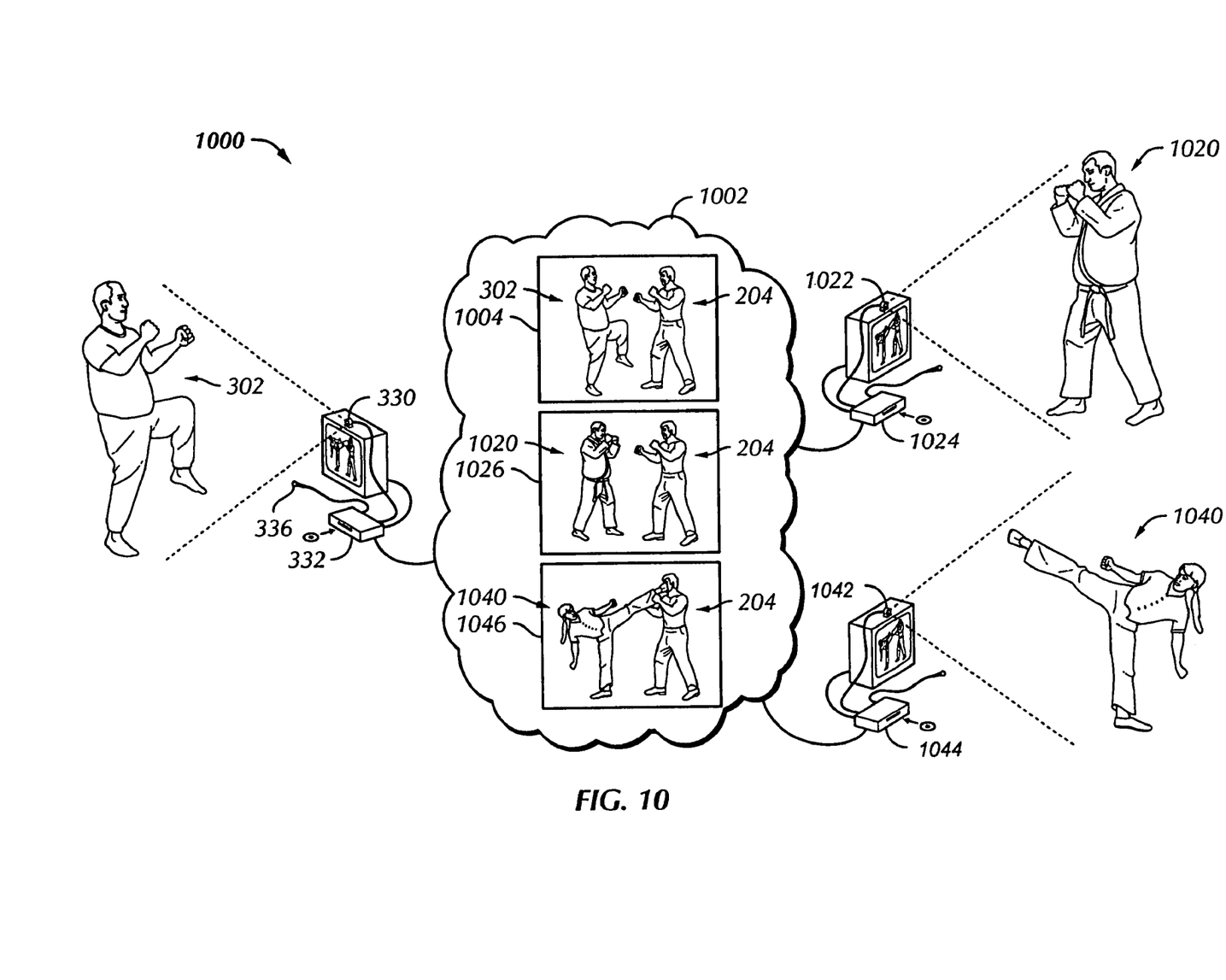
FIG. 10 is a pictorial diagram illustrating a system that operates in accordance with embodiments of the present invention.

Referring to FIG. 10, there is illustrated an example system 1000 for implementing an online scenario in accordance with an embodiment of the present invention. The system 1000 may use one or more of the methods, teachings, and/or techniques described above. The system 1000 includes an online community 1002. An example of an online community is PlayStation Home™, which is being developed by Sony Computer Entertainment Inc. of Japan.

As shown, the processor based system 332 used by the user 302 is coupled to the online community 1002. In this scenario the processor based system 332 serves as a client device. This allows the new video segment created by the user 302 (FIG. 5B) to be displayed in the online community 1002. The new video segment is indicated at 1004.

Additional users 1020 and 1040 are also members of the online community 1000. The user 1020 has access to a camera 1022 that is coupled to a processor based system 1024. Similarly, the user 1040 has access to a camera 1042 that is coupled to a processor based system 1044. Both of the processor based systems 1024, 1044 are coupled to the online community 1002.

During operation in some embodiments, data may be received from the one or more additional cameras 1022, 1042 that each capture a different performance. Additional video segments are generated that are each representative of the reference video segment having a portion thereof that is replaced with at least a portion of one of the captured different performances. A representation of each additional video segment is displayed in the online community. Furthermore, feedback may be provided to each client device relating to the portion of its respective captured performance.

For example, a performance by the user 1020 is captured by the camera 1022 that is coupled to the processor based system 1024. A new video segment created by the user 1020 is then displayed in the online community 1002. The new video segment is indicated at 1026. Similarly, a performance by the user 1040 is captured by the camera 1042 that is coupled to the processor based system 1044. A new video segment created by the user 1040 is then displayed in the online community 1002. The new video segment is indicated at 1046.

The system 1000 may be used for many different types of games, contests, activities, etc. For example, the users 302, 1020, and 1040 may compete to determine who can best mimic or imitate the character 202's kick in the reference video segment shown in FIGS. 2A, 2B and 2C. The performances by the users 302, 1020, and 1040 may be evaluated or judged by other users and/or judges in the online community 1002. Namely, such other users and/or judges will be able to view all three of the performances and provide feedback as described above. In some embodiments, the performances by the users 302, 1020, and 1040 may be evaluated or judged by automated means as described above.

In other scenarios, the system 1000 may be used by players to "audition" and compete for leading roles in famous scenes for other online players to view/judge/critique. This may include celebrity judges viewing a player's performance. It may even lead to a player possibly getting discovered or at least feeling like a star. For example, players may be able to compete for an actual role or audition for a major motion picture or reality show right in their own living room without needing expensive equipment or submitting materials through the mail. This is because everything can be transmitted online. The system 1000 may even be used to submit applications for contest opportunities to do real on-air spots. Or, the system 1000 may be used just to record an audition or performance and then post it online for others to enjoy/comment. In addition, the system 1000 may be used by users to download new scenes/scripts from an online store for future content.

In some embodiments, the above-described methods and techniques may be used for implementing any number of mini-games. For example, a player can "act out" or "role play" various television personalities and professions. This can be fun while also giving the player an opportunity to hone his or her skills at an interesting profession. Such mini-games may also provide fun "party games" where players can "ham it up" for the camera and have fun. Examples of television personalities and professions upon which the mini-games may be based may include: entertainment news reporter introducing a famous gossip segment, music video, movie trailer, etc.; TV news anchor; TV meteorologist; TV traffic reporter; TV field reporter; TV sports commentator (famous scenes of sports can be included); host of Saturday Night Live (opening monologue); host of a late night TV show (opening monologue); TV evangelist; and TV infomercial (selling odd products a player may have to come up with pitch lines and product descriptions). Another example may include a business presentation scenario. Namely, a large boardroom may be full of people with serious expressions wearing suits sitting at a table watching the player. The player then stands in front of the people (i.e. via a camera) and makes a speech or a comedic monologue. This scenario may even be used for practice purposes for those in the business world to practiced real life "big" presentations.

In some embodiments, the system 1000 may be used for creating "video blogs". For example, such blogs may be created by members of an online community. A user may create an account, and he or she may use provided scenic templates. Such templates may provide different personalities/moods. For example, a sports fan might use a template showing sports related background, images, etc., to post short "video blogs" of whatever he or she wished to broadcast to their online community, friends, etc. The templates may be downloaded, such as from the online community. A player may even post video into his or her own online community apartment where others can view the video.

Thus, the above-described methods and techniques allow a player, performer, or other user to act, perform, or simply appear in a famous scene. The user may then save the scene and share it with friends and family or post it online. The methods and techniques also provide the player the opportunity to use a processor based system, such as an entertainment system or game console, to broadcast personal messages, unique style, and who they are to an online community or other users on a network. This may be useful for activities such as online dating.

In some embodiments, the above-described methods and techniques may be implemented using blue-screen technology. Namely, a player may hang a blue screen and then stand in front of it to act out and perform the various scenes. A blue screen may optionally be included with the software and/or system for implementing the above-described methods and techniques. However, such blue screen technology is not required. It is believed the above-mentioned Z-camera can be used to implement the above-described methods and techniques without using blue-screen technology.

In some embodiments, video "props" may also be used. For example, the system may be configured to recognize a white glove, which would enable the player to "hold" props onscreen, such as for example, a gun, cup of coffee, etc., depending on the scene.

Figure 11:
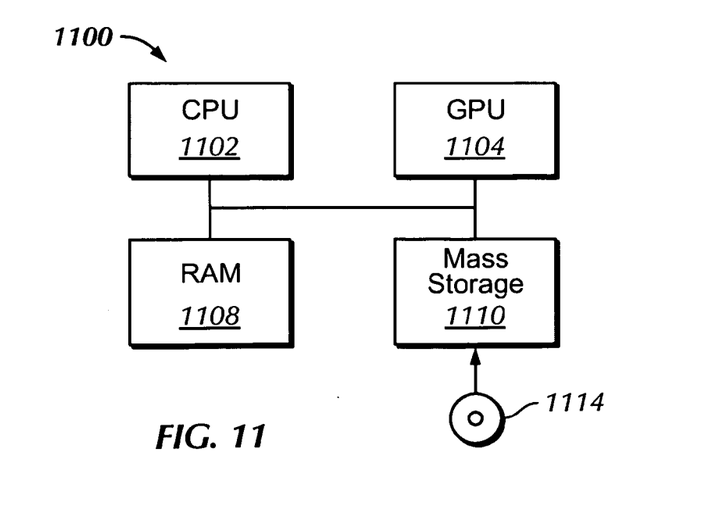
FIG. 11 is a block diagram illustrating a processor based system that may be used to run, implement and/or execute the methods and/or techniques shown and described herein in accordance with embodiments of the present invention.

The methods and techniques described herein may be utilized, implemented and/or run on many different types of systems. Referring to FIG. 11, there is illustrated a system 1100 that may be used for any such implementations. One or more components of the system 1100 may be used for implementing any system or device mentioned above, such as for example any of the above-mentioned consoles, game consoles, entertainment systems, processor based systems, etc. However, the use of the system 1100 or any portion thereof is certainly not required.

By way of example, the system 1100 may include, but is not required to include, a central processing unit (CPU) 1102, a graphics processing unit (GPU) 1104, a random access memory (RAM) 1108, and a mass storage unit 1110, such as a disk drive. The system 1100 may be coupled to, or integrated with, any of the other components described herein, such as the camera 330 (FIG. 3), display 334, microphone 336, and/or online community 1002 (FIG. 10). The system 1100 comprises an example of a processor based system. The CPU 1102 and/or GPU 1104 may be used to execute or assist in executing the steps of the methods and techniques described herein, and various program content, images, avatars, representations, communities, and interfaces may be rendered on a display.

The mass storage unit 1110 may include or comprise any type of computer readable storage or recording medium or media. The computer readable storage or recording medium or media may be fixed in the mass storage unit 1110, or the mass storage unit 1110 may optionally include removable storage media 1114, such as a digital video disk (DVD), Blu-ray disc, compact disk (CD), USB storage device, floppy disk, or other media. By way of example, the mass storage unit 1110 may comprise a disk drive, a hard disk drive, flash memory device, USB storage device, Blu-ray disc drive, DVD drive, CD drive, floppy disk drive, etc. The mass storage unit 1110 or removable storage media 1114 may be used for storing computer program code that implements the methods and techniques described herein.

Thus, removable storage media 1114 may optionally be used with the mass storage unit 1110, which may be used for storing code that implements the methods and techniques described herein, such as code for creating the above-described new video segments, performing the comparisons, scoring, and corrections, and implementing the online features. However, any of the storage devices, such as the RAM 1108 or mass storage unit 1110, may be used for storing such code. For example, any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM 1108 or mass storage unit 1110, may be used for storing any needed database(s).

In some embodiments, one or more of the embodiments, methods, approaches, and/or techniques described above may be implemented in a computer program executable by a processor based system. By way of example, such processor based system may comprise the processor based system 1100, or a computer, entertainment system, game console, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described capturing a performance, generating a new video segment, comparing aspects of performances, providing feedback, etc. As another example, such computer program may be used for implementing any type of tool or similar utility that uses any one or more of the above described embodiments, methods, approaches, and/or techniques. In some embodiments, the computer program may comprise a video game, role-playing game (RPG), or other computer simulation. In some embodiments, program code modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

Therefore, in some embodiments the present invention provides a storage medium storing a computer program adapted to cause a processor based system to execute steps comprising: receiving a selection of a reference video segment; capturing a performance with a camera; generating a new video segment that is representative of the reference video segment having a portion thereof that is replaced with at least a portion of the captured performance; and displaying the new video segment on a display; wherein the camera and the display are coupled to the processor based system that performs the steps of receiving and generating.

As another example, in some embodiments the present invention provides a storage medium storing a computer program adapted to cause a processor based system to execute steps comprising: displaying a reference video segment in an online community; receiving data from a camera capturing a performance, wherein the camera is coupled to a client device; generating a new video segment that is representative of the reference video segment having a portion thereof that is replaced with at least a portion of the captured performance; displaying a representation of the new video segment in the online community; and providing to the client device feedback relating to the portion of the captured performance.

As another example, in some embodiments the present invention provides a storage medium storing a computer program adapted to cause a processor based system to execute steps comprising: capturing a performance with a camera; receiving output data from the camera that is representative of the performance; processing the output data to compare one or more aspects of the performance with corresponding aspects of a reference performance; and providing an indication of how closely the performance matches the reference performance.

While the invention herein disclosed has been described by means of specific embodiments and applications thereof, numerous modifications and variations could be made thereto by those skilled in the art without departing from the scope of the invention set forth in the claims.

What is claimed is:

1. A storage medium storing a computer program adapted to cause a processor based system to execute steps comprising:
   receiving a selection of a reference video segment;
   capturing a performance with a camera;
   generating a new video segment that is representative of the reference video segment having a portion thereof that is replaced with at least a portion of the captured performance; and
   displaying the new video segment on a display;
   wherein the camera and the display are coupled to the processor based system that performs the steps of receiving and generating;
   wherein the reference video segment comprises a video segment from a work, and a camera view in the video segment from the work has been modified in the reference video segment.

2. The storage medium of claim 1, wherein the computer program is further adapted to cause the processor based system to execute steps comprising:
   capturing audio provided by the performance with a microphone that is coupled to the processor based system; and replacing at least a portion of original audio in the reference video segment with corresponding portions of the captured audio.

3. The storage medium of claim 1, wherein:
the reference video segment includes at least one character;
the performance comprises a performance by a user; and
the step of generating a new video segment comprises replacing at least a portion of the character with a corresponding portion of the user.

4. The storage medium of claim 1, wherein:
the work comprises one of a previously published movie, television show, television broadcast, video game, sporting event, and music video.

5. A storage medium storing a computer program adapted to cause a processor based system to execute steps comprising:
displaying a reference video segment in an online community;
receiving data from a camera capturing a performance, wherein the camera is coupled to a client device;
generating a new video segment that is representative of the reference video segment having a portion thereof that is replaced with at least a portion of the captured performance;
displaying a representation of the new video segment in the online community; and
providing to the client device feedback relating to the portion of the captured performance.

6. The storage medium of claim 5, wherein the computer program is further adapted to cause the processor based system to execute steps comprising:
receiving data from one or more additional cameras that each capture a different performance, wherein each camera is coupled to a different client device;
generating additional video segments that are each representative of the reference video segment having a portion thereof that is replaced with at least a portion of one of the captured different performances;
displaying a representation of each additional video segment in the online community; and
providing to each client device feedback relating to the portion of its respective captured performance.

7. A storage medium storing a computer program adapted to cause a processor based system to execute steps comprising:
capturing a performance with a camera;
receiving output data from the camera that is representative of the performance;
processing the output data to compare one or more aspects of the performance with corresponding aspects of a reference performance; and
providing an indication of how closely the performance matches the reference performance.

8. The storage medium of claim 7, wherein:
the performance comprises a performance by a user;
the reference performance comprises a performance by a character; and
the comparing one or more aspects of the performance with corresponding aspects of the reference performance comprises comparing gestures by the user with gestures by the character.

9. The storage medium of claim 7, wherein the computer program is further adapted to cause the processor based system to execute steps comprising:
capturing audio provided by the performance; and
wherein the comparing one or more aspects of the performance with corresponding aspects of the reference performance comprises comparing the captured audio provided by the performance with audio provided by the reference performance.

10. The storage medium of claim 7, wherein the computer program is further adapted to cause the processor based system to execute steps comprising:
generating a new video segment that is representative of the reference performance having a portion thereof that is replaced with at least a portion of the captured performance; and
modifying the portion of the captured performance in the new video segment so that the portion of the captured performance more closely matches a corresponding portion in the reference performance.

* * * * *

UNITED STATES PATENT AND TRADEMARK OFFICE
CERTIFICATE OF CORRECTION

| | | |
|---|---|---|
| PATENT NO. | : 8,177,611 B2 | Page 1 of 1 |
| APPLICATION NO. | : 12/333160 | |
| DATED | : May 15, 2012 | |
| INVENTOR(S) | : Peter Kang | |

It is certified that error appears in the above-identified patent and that said Letters Patent is hereby corrected as shown below:

On the Title Page, item (74); Column 2, Line 1 of Attorney, Agent, or Firm, delete "Flitch" and insert --Fitch--, therefor.

Signed and Sealed this
Twenty-eighth Day of August, 2012

David J. Kappos
*Director of the United States Patent and Trademark Office*